United States Patent [19]

Uno, deceased et al.

[11] 4,235,258
[45] Nov. 25, 1980

[54] DRIVING DEVICE FOR OPENING AND CLOSING A VALVE

[75] Inventors: Takayoshi Uno, deceased, late of Osaka, Japan, by Motoka Uno, heir; by Takaaki Uno, heir, Nara, Japan; by Yoshishige Uno, heir, Tokyo, Japan; by Hiroyoshi Uno, heir, Yao, Japan; Takashi Ida, Suita, Japan; Minoru Onaka, Osaka, Japan; Hayato Shigeta, Osaka, Japan

[73] Assignee: Tomoe Technical Research Company, Osaka, Japan

[21] Appl. No.: 866,623

[22] Filed: Jan. 3, 1978

Related U.S. Application Data

[63] Continuation-in-part of Ser. No. 686,996, May 17, 1976, abandoned.

[51] Int. Cl.³ .................................................. F16K 37/00
[52] U.S. Cl. ........................... 137/556; 74/424.8 VA; 251/113; 251/229; 251/267; 251/297
[58] Field of Search .................. 251/14, 90, 92, 95, 251/100, 111, 113, 229, 215, 265, 267, 270, 273, 291; 74/424.8 VA; 137/553, 556

[56] References Cited

U.S. PATENT DOCUMENTS

| | | | |
|---|---|---|---|
| 2,075,443 | 3/1937 | Kirschner et al. | 251/100 |
| 2,930,571 | 3/1960 | Vogl | 251/267 |
| 3,184,214 | 5/1965 | King | 251/229 |
| 3,298,659 | 1/1967 | Cupedo | 251/14 |
| 3,367,365 | 2/1968 | Stevens | 251/229 |
| 3,396,938 | 8/1968 | Matsui | 251/229 |
| 3,477,687 | 11/1969 | Doutt | 251/100 |
| 3,542,331 | 11/1970 | Canalizo | 251/113 |
| 3,606,801 | 9/1971 | Williams | 74/424.8 VA |

FOREIGN PATENT DOCUMENTS

573716 12/1945 United Kingdom ..................... 251/100

Primary Examiner—Martin P. Schwadron
Assistant Examiner—G. L. Walton

[57] ABSTRACT

A driving device for opening and closing a valve comprises a cylindrical body, an actuating cylinder, a spindle, a piston member, a transparent plate and a stop means for controlling the rotation of the spindle. Said stop means comprises a ring gear, a spring and a stop bar having a wedge-shaped head, said wedge head having a pair of surfaces forming an included angle which is bisected by the axis of the stop bar such that rotation of the spindle by fluid pressure on the valve is prevented but manual rotation of the spindle in either direction is permitted.

1 Claim, 9 Drawing Figures

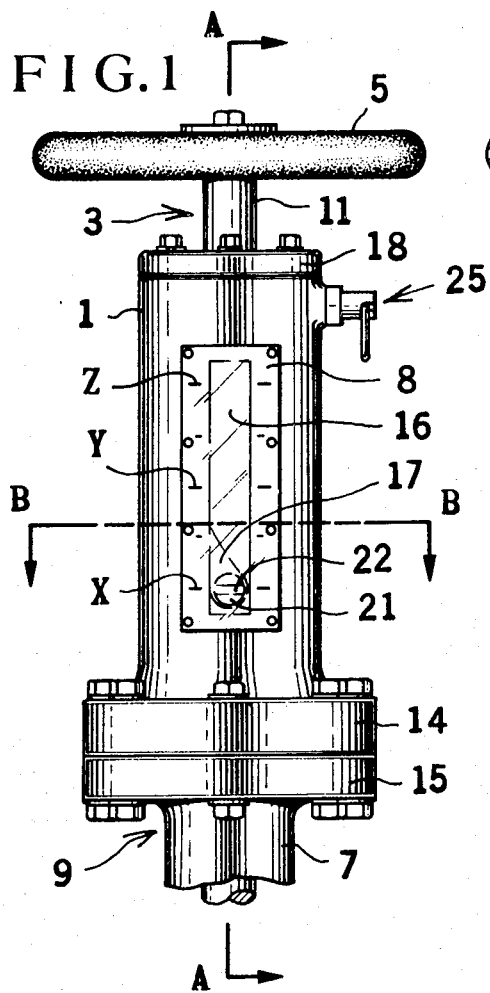
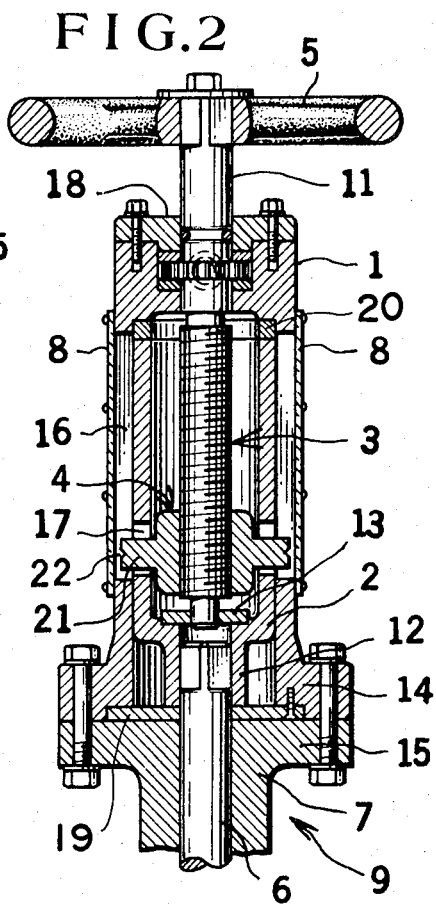
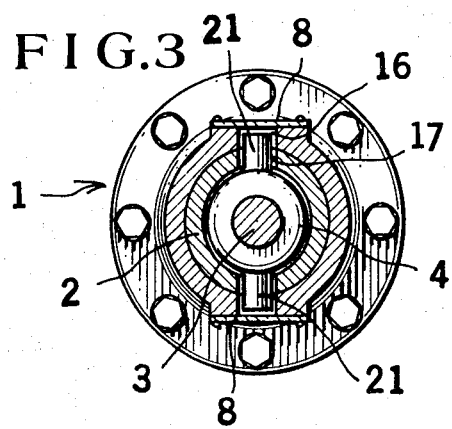
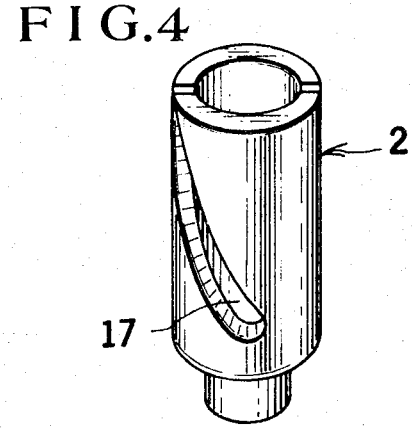

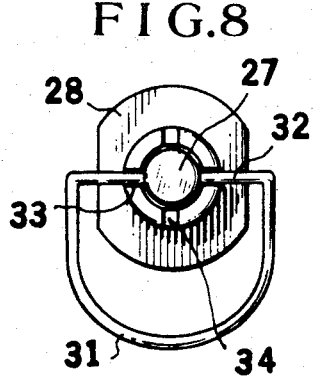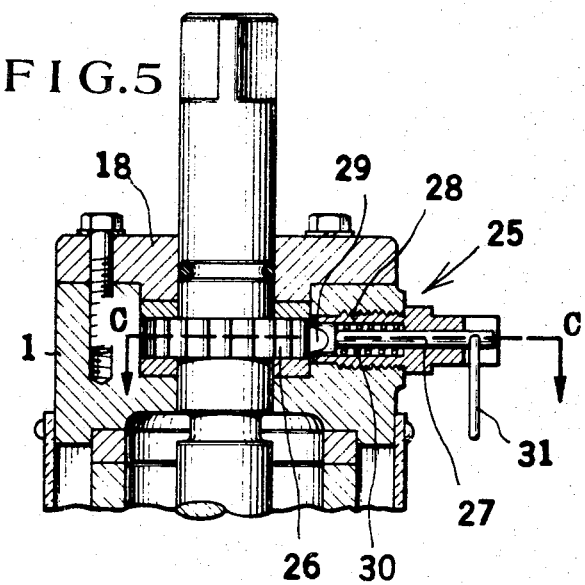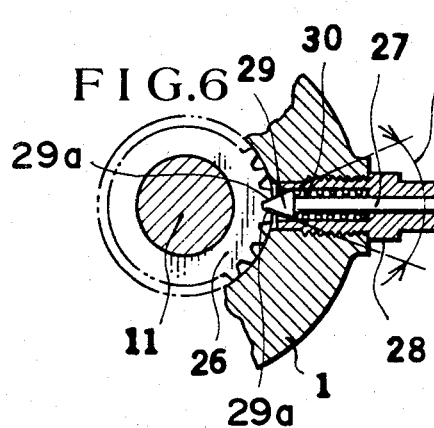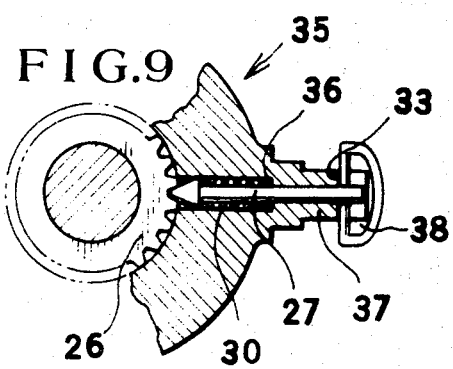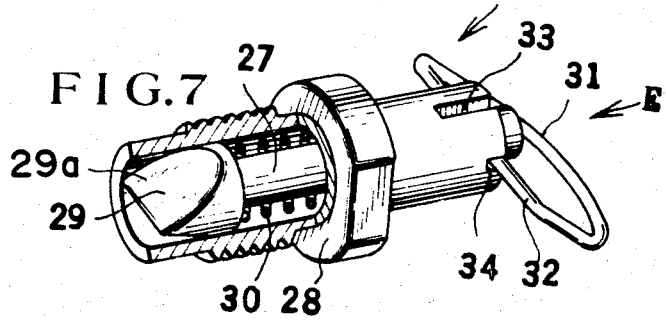

DRIVING DEVICE FOR OPENING AND CLOSING A VALVE

This application is a continuation-in-part of our co-pending application Ser. No. 686,996 filed May 17, 1976, The present invention relates to a driving device for opening and closing a butterfly valve or other similar valves by rotating a valve stem thereof.

It is essential in a butterfly valve or other similar valves that a reduction apparatus should be mounted on a valve stem to facilitate controlling the flow quantity, because of the small angle through which the valve stem rotates so as to move the valve from the closed position to the entirely open position or vice versa. Well known examples of reduction apparatus of this type are an apparatus comprising worm gears and worm wheels in combination, and an apparatus comprising screws, levers and the like. In any of these reduction apparatus, an actuating rod is disposed substantially perpendicularly to the valve stem, and it is impossible, therefore, to operate this apparatus right over the valve stem, whereby a lot of space is lost when it is operated. As a result of this, a need exists for a driving device for opening and closing a valve in which an actuating rod is aligned coaxially with a valve stem and a handle is disposed horizontally, thereby permitting the driving device to be operated in a manner similar to that for opening and closing a gate valve.

A means for actuating a butterfly valve with this feature is disclosed in the U.S. Pat. No. 3,298,659, which comprises a valve body, a rotatable spindle for said valve, an axially movable actuating rod disposed in alignment with said rotatable spindle, a member fixedly connected to said valve body extending axially throughout its length having a slot, a cylindrical member surrounding said actuating rod mounted for movement only connected to said spindle so as to be restrained from rotation relative to said spindle having a slot having a substantially helical configuration with axial end portions concentric with said first named slot, one of said axial end portions locking said valve in closed position, said actuating rod having at least one radial projection cooperating with the edges of said two concentric slots, the helical configuration of said second named slot in said cylindrical member comprising two sections which are at an angle relative to each other, one of said sections which immediately follows the axial end portion which locks the valve in its closed position being at a smaller angle to the axis of said cylinder than the other of said helical sections, a threaded spindle mounted for rotary movement only is provided and said actuating rod is hollow and is internally threaded over part of its length to cooperate with said threaded spindle to enable the valve to be opened and closed manually.

The structure of the patented means for actuating a butterfly valve, however, is such as to allow dirt, dust and the like to penetrate said means and thereby possible to lead to mechanical trouble thereof even if said means are formed from corrosion resistant material, because its interior constructions are completely exposed. In order to eliminate this disadvantage, various driving device of this type have been suggested, such as the one in which its interior constructions are completely enclosed by a cylindrical casing. A serious disadvantage with this form of driving device for opening and closing a valve, however, is that it is impossible to judge from outside in which position the valve is maintained.

Furthermore, it has been found that when conventional driving devices are subjected to vibration, impact or the like, the valve stems tend to rotate slightly. In butterfly valves, it is desirable that the valve be capable of being firmly held in open position or in closed position, and that the angle through which rotation of the valve stem is effected be kept constant so as to correctly control the fluid flow.

Although there exists in known art a driving device for opening and closing the valve having a stopper means for checking the rotation of the valve caused by fluid, there has never been a device which can check the rotation of the valve caused by fluid and at the same time can be rotated in either direction for the purpose of setting the valve by the manual rotation in an open position, a closed position, or an intermediate position.

It is an object of the present invention to provide a driving device for opening and closing a valve wherein opening and closing operations of a valve can be performed on the extension of a valve stem, wherein the sealing of a reduction mechanism for the valve is achieved, and wherein it is possible to easily judge from outside in which position the valve is maintained.

It is another object of the present invention to provide a driving device for opening and closing a valve in which there is provided a stop means for preventing the rotation of a valve stem so that a valve member may be kept in closed position, or in open position at an arbitrary angle.

It is still another object of the present invention to provide a driving device for opening and closing a valve which can prevent the rotation of a valve caused by the fluid pressure wherever the valve is located and which comprises a stop means allowing the operator to rotate the valve in either direction by manual force.

Said stop means according to the present invention checks not only the reverse driving caused by the valve to which a rotational power is exerted owing to the fluid pressure, but also arbitrary movements caused by the vibration of the handle, etc. A spindle is sustained in a semi-fixed condition by this stop member.

One embodiment of the present invention will be now described by way of example with reference to the accompanying drawings, in which:

FIG. 1 is a front view of a driving device according to the present invention, installed on a valve;

FIG. 2 is a vertical sectional view taken along the line A—A of FIG. 1;

FIG. 3 is a transverse sectional view taken along the line B—B of FIG. 1;

FIG. 4 is a perspective view of an actuating cylinder of the driving device of FIG. 1;

FIG. 5 is a vertical sectional view of one embodiment of a stop means of the driving device;

FIG. 6 is a sectional view taken along the line C—C of FIG. 5;

FIG. 7 is a partially cutaway view in perspective of the stop means;

FIG. 8 is a side view of the stop means seen in the direction of the arrow E of FIG. 7;

FIG. 9 is a sectional view corresponding to FIG. 6, showing a modification of a stop means.

Referring now to FIGS. 1 to 3, reference numeral 1 designates a cylindrical body as a casing of a driving device according to the present invention. Inside said cylindrical body 1, there is provided a rotatable actuating cylinder 2, in which is further mounted a spindle 3 for rotation, said cylindrical body 1, said actuating cylinder 2 and said spindle 3 being coaxial with each other.

A handle 5 for manually rotating the spindle 3 is mounted on the top end portion of the spindle 3 which protrudes above the upper end of the cylindrical body 1. The lower end portion of the spindle 3 is rotatably supported by a smaller-diametered portion 12 of the actuating cylinder 2 through a medium of a bearing member 13.

A lower end of the actuating cylinder 2 is supported on the upper surface of the valve body 7 through a plate 19, and a ring 20 is provided between an upper end of the actuating cylinder 2 and an upper end of the cylindrical body 1. Therefore, the actuating cylinder 2 is securely confined between the plate 19 on the valve body 7 and the ring 20 located on the upper part of the cylindrical body 1. Said plate 19 and ring 20 are formed by anti-friction members of the same kind, made of plastics or metal. The lower end 12 of the cylindrical body has a rectangular cross section which is shaped to mate with the rectangular upper end of the valve stem 6, and the cylindrical body 1 can therefore be attached to the valve body merely by inserting the upper end of the valve stem through the opening in the anti-friction plate 19 and into the lower end 12 of the actuating cylinder. The valve stem 6 is aligned coaxially with spindle 3.

The lower end of the cylindrical body 1 is a flange 14, which is secured to the flange-shaped upper end of a valve body 7 of the valve 9 by means of bolts.

The top end of the cylindrical body 1 is provided with a cover, generally designated by 18.

As best seen from FIGS. 3 and 4, the actuating cylinder 2 is provided with two diametrically opposed substantially helical guide grooves 17. Each of said guide grooves 17 extends through a central angle of substantially 90° with respect to the axis of the actuating cylinder 2, i.e., through substantially a quarter of the periphery thereof. One of the guide grooves 17 is 180° displacement with respect to the other. The guide grooves 17 may comprise sections at different angles of inclination to the axis of the actuating cylinder 2, thereby permitting the valve stem to the rotated at a changeable angular velocity instead of a uniform one.

An internal screw thread of a piston member 4 is engaged with a threaded portion formed in the spindle 3 so that the piston member 4 is moved along the spindle 3 by rotating the same. The pitch of the threaded portion of the spindle 3 is determined suitably, considering the torque and the time required for the valve to be opened or to be closed.

The piston member 4 is provided on its outer peripheral surface with two diametrically opposed rod-shaped projections 21, extending perpendicularly to the axis of the piston member 4, while the cylindrical body 1 being provided in its peripheral wall with two diametrically opposed and axially extending slender slots 16. Each of said rod-shaped projections 21 of the piston member 4 slidably extends through the corresponding guide groove 17 of the actuating cylinder 2 with its end projecting into said slender slot 16 of the cylindrical body 1, thereby the rotation of the projection and the piston member being prevented. The free end of each rod-shaped projection 21 is provided with a mark 22, which provides an increase in the conspicuity of the piston member 4 moving up and down. Said guide groove 17, said slender slot 16 and said rod-shaped projection 21 are not limited in number, except that they are of the same number of equal to or more than 1.

Outside the slender slots 16 of the cylindrical body 1 are mounted two transparent plates 8 so as to seal the slots 16. Said transparent plates 8 are formed from tempered glass, transparent reinforced plastic plates or the like. An operator is able to visually know the position of the rod-shaped projections 21 with respect to the vertical direction through said transparent plates. Marks x, y, z or the like are provided on the outer or the inner surface of each transparent plate, or on the outer surface of the cylindrical body 1, thereby permitting correct and immediate recognition of the position which the valve member occupies.

Reference numeral 25 designates a stop means, mounted on the upper portion of the driving device according to the present invention. Said stop means 25, illustrated in more details in FIGS. 5 and 6, includes a stop bar 27 which is movable radially inward relative to the cylindrical body 1 to engage with a ring gear 26 fixed to the spindle 3, whereby the spindle 3 is locked from rotation.

Said stop bar 27 of the stop means 25 is axially movably inserted in an adapter 28 fitted in a threaded hole formed in the cylindrical body 1, and one end of said stop bar 27 comprises a wedge-shaped head 29 adapted to engage with teeth of the ring gear 26. Furtherfore, the stop bar 27 is fitted in a spring 30, which causes the stop bar 27 to move radially inward, i.e., in such a direction as to permit engagement of the wedge-shaped head 29 with the ring gear 26.

Said ring gear 26 has the involute tooth or cycloid tooth, etc. and the involute spline or rectangular spline may be replaced with the ring gear.

The wedge head 29 has a pair of surfaces 29a, 29a forming an included angle $\theta$ (shown in FIG. 6) which is bisected by the axis of the stop bar 27, whereby rotation of the spindle by fluid pressure on the valve is prevented but manual rotation of the spindle in either direction is permitted. Manual rotation of the spindle 3 to open the valve can be effected by applying sufficient torque to the spindle 3 to urge one of the surfaces of the wedge-shaped head 29 out of engagement with the ring gear against the bias of the spring 30. Manual rotation of the spindle 3 to close the valve can be effected by applying sufficient torque to the spindle 3 to urge the other of the surfaces of the wedge-shaped head 29 out of engagement with the ring gear against the bias of the spring 30.

On the other end of the stop bar 27 is mounted a pull 31, the straight portion of which extends through the stop bar 27 and is capable of fitting in two pairs of grooves 33, 34 formed in the corresponding end portion of the adapter 28. These two pairs of grooves 33, 34 are disposed in directions perpendicularly intersecting each other. Engagement of the wedge-shaped head 29 with the ring gear 26 is effected when the pull 31 is fitted in the grooves 33, while this engagement ceases to take effect when the pull 31 is fitted in the grooves 34. Thus determined are arrangement and depth of these pairs of grooves 33, 34 relative to the adapter 28.

Referring now to FIG. 9, there is illustrated a modification of the stop means. This stop means 35 is not provided with an adapter. Therefore, the spring 30 and the stop bar 27 are housed in a slot formed in the cylindrical body 1, and the cylindrical body 1 is provided with a projection 37 provided with the two pairs of grooves 33 and 34 (not shown).

The manner of operation of the driving device according to the present invention will be described in brief. The description is based upon an assumption that when the piston member 4 is at a position X shown in FIG. 1, the valve is maintained in closed position. The spindle 3 is rotated by means of the handle 5 so that the piston member 4 is moved upward along the spindle 3 in the cylindrical body 1, whereupon the piston member 4 performs a rectilinear motion only, since the rod-shaped projections 21 of the piston member 4 is inserted in the slender slot 16 to be restrained from rotation. As a result of this upward movement of the piston member 4, the actuating cylinder 2 is forced to rotate, since the rod-shaped projections 21 extend through the guide grooves 17. The angle through which rotation of the actuating cylinder 2 is effected is about 90°, depending on the length of each of the guide grooves 17. When the actuating cylinder 2 has finished rotating through substantially 90°, the piston member 4 reaches a position designated by Z, whereupon the valve stem 6 is rotated through the same angle by the actuating cylinder 2 so as to move the valve to its fully open position. A position Y of the piston member 4 indicates that the valve is held in half open position, i.e., held open at an angle of about 45°.

In order to maintain the piston member 4 at the positions X, Y, Z or at any position therebetween, the stop bar 27 is engaged with the ring gear 26 so that the spindle 3 is locked from rotation relative to the cylindrical body 1 to be caused through the valve owing to the fluid pressure. To this end the straight portion 32 of the pull 31 is fitted in the grooves 33. In order to rotate the spindle 3, the stop bar 27 is moved radially outward relative to the cylindrical body 1 by pulling the pull 31, so that the engagement of the wedge-shaped head 29 of the stop bar 27 with the ring gear 26 is released, and then the pull and the stop bar is rotated through 90° so that the straight portion 32 is fitted in the grooves 34.

The spindle 3 can be rotated by rotating the handle 5 even when said pull 31 is not operated, that is, when the wedge head of the stop bar 27 is engaged with the ring gear.

Therefore, the device according to the present invention can be operated by manually overcoming the stopping force of the stop means at various positions of the valve. For example, when the valve is fully closed, the operator can manually turn the handle to open the valve against the stopping force of the stop means. When the valve is in an intermediate position, the operator can manually turn the handle toward either the fully closed or fully opened position. When the valve is in the fully opened position, the operator can turn the valve toward the closed position. In each case, the stop means prevents the valve from being turned by the fluid pressure.

What is claimed is:

1. A driving device for opening and closing a valve comprising:

a cylindrical body having a cylindrical inner surface provided with at least one axially extending slender slot therein, the cylindrical body being adapted to be mounted on the upper portion of a valve body;

an actuating cylinder rotatably housed within said cylindrical body and having an outer surface having a diameter slightly less than the diameter of the inner surface of the cylindrical body, the actuating cylinder being provided with at least one substantially helical guide groove in the circumferential wall thereof, and adapted to be connected to a valve stem;

a spindle having an upper portion rotatably supported by said cylindrical body and a lower end portion rotatably supported by a bearing in said actuating cylinder, the spindle including a threaded portion and being aligned coaxially with the valve stem, said cylindrical body and said actuating cylinder;

a piston member within the actuating cylinder and having an internal screw thread engaged with said threaded portion of the spindle and at least one rod-shaped projection extending radially outwardly through said guide groove of the actuating cylinder and into said slender slot of the cylindrical body, rotation of the projection and the piston member being prevented by the slender slot; and a transparent plate mounted on the outer circumferential surface of the cylindrical body for sealing said slender slot of the cylindrical body while permitting visual observation of the position of the rod-shaped projection; and stop means for controlling the rotation of the spindle mounted on the upper portion of the cylindrical body and comprising a ring gear mounted on said spindle, each tooth of the ring gear having two franks symmetrically arranged with respect to the plane formed by connecting the center of the spindle and the center of a tooth crest of the ring gear, a stop bar supported so as to be moveable radially relative to the cylindrical body and having a wedge-shaped head engageable with said ring gear, and a spring biasing said stop bar radially inwardly relative to the ring gear, the wedge head having a pair of surfaces forming an included angle which is bisected by the axis of the stop bar such that rotation of the spindle by fluid pressure on the valve is prevented but manual rotation of the spindle in either direction is permitted, and manual rotation of the spindle to open the valve can be effected by applying sufficient torque to one frank of each tooth of the ring gear through the spindle to urge one of the surfaces of the wedge-shaped head out of engagement with the one frank of the tooth of the ring gear against the bias of the spring and manual rotation of the spindle to close the valve can be effected by applying sufficient torque to the other frank of each tooth of the ring gear through the spindle to urge the other of the surfaces of the wedge-shaped head out of engagement with the other frank of the tooth of the ring gear against the bias of the spring.

* * * * *